(No Model.) 2 Sheets—Sheet 2.
W. N. WEMMER.
HOT WATER HEATING APPARATUS FOR BUILDINGS.
No. 553,199. Patented Jan. 14, 1896.
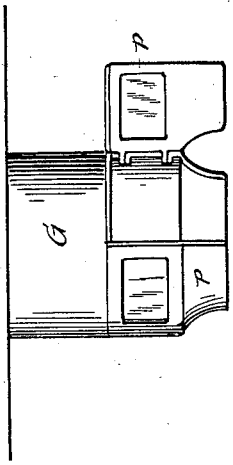
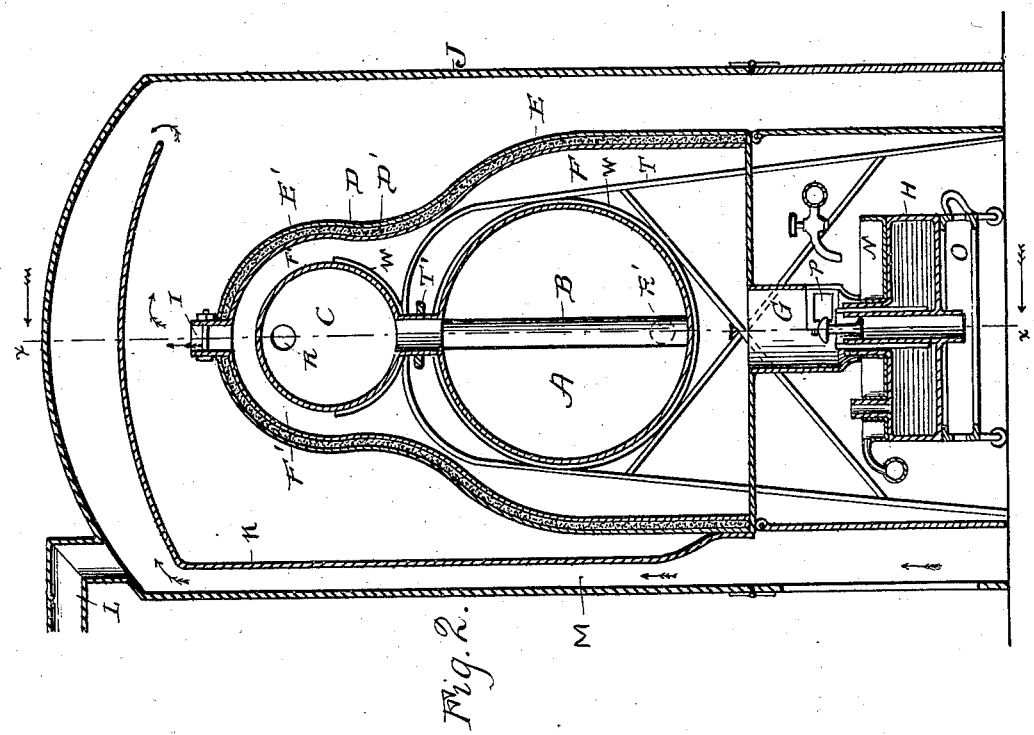
WITNESSES
Geo. M. Anderson
Philip C. Masi.
INVENTOR
W. N. Wemmer
by E. W. Anderson
his Attorney

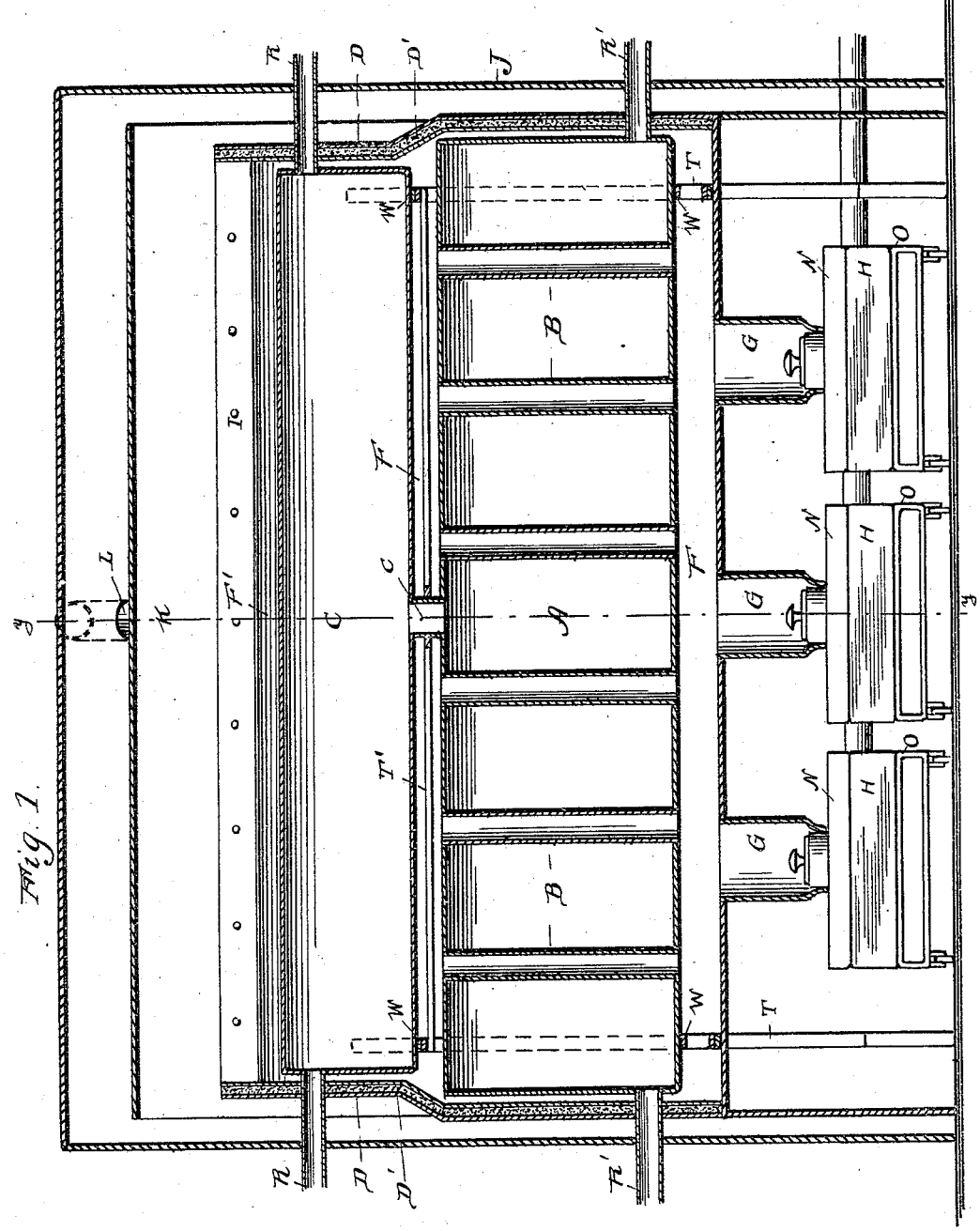

United States Patent Office.

WILLIAM N. WEMMER, OF TRENTON, ASSIGNOR OF ONE-THIRD TO SARAH H. VIVIAN, OF LAWRENCEVILLE, NEW JERSEY.

HOT-WATER HEATING APPARATUS FOR BUILDINGS.

SPECIFICATION forming part of Letters Patent No. 553,199, dated January 14, 1896.

Application filed May 4, 1895. Serial No. 548,183. (No model.)

*To all whom it may concern:*

Be it known that I, WILLIAM N. WEMMER, a citizen of the United States, and a resident of Trenton, in the county of Mercer and State of New Jersey, have invented certain new and useful Improvements in Hot-Water and Steam Heating Apparatus; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a section through the invention on line $x\,x$, Fig. 2. Fig. 2 is a sectional view taken on line $y\,y$, Fig. 1. Fig. 3 is a detail of one of stacks G.

The object of this invention is to provide safe and effective hot-water and steam heating apparatus, wherein the heat is furnished by oil lamps or burners, and more particularly designed for use in connection with hot-water-circulating and steam-heating systems.

The invention consists in the novel construction and combination of parts, all as hereinafter described, and pointed out in the appended claims.

Referring to the accompanying drawings, the letter A designates a horizontal boiler or heating-tank, having a series of vertical heating-flues B, and connecting by a neck $c$ with a superimposed hot-water drum C. Said boiler and drum are inclosed in a double-wall sheet-iron shell or drum D, the space between the walls of which is filled with asbestos or other suitable packing D'.

It will be observed from the drawings, Fig. 2, that the cross-sectional form of this shell or drum is in general form similar to the cross-section of the boiler and hot-water drum—that is to say, it has a lower cylindric portion, E, placed concentrically around the boiler, and a smaller upper cylindric portion, E', which surrounds the water-drum and which opens into the lower portion E. The portions of said shell or drum are of considerably larger diameter, respectively, than the boiler and water-drum, so that the latter are entirely surrounded by a heating-chamber F F'. From the lower portion of said shell or drum depend a series of hollow stacks G, each of which is designed to receive the burner of a lamp H, as seen in the drawings.

I I indicate openings in the top of the shell or drum through which the smoke and gases of combustion escape from the chamber F'.

J is an outer inclosing case or shell, and K is a metal wall, which extends up at one side of the boiler and drum and over the latter.

L is the stack or pipe into which the smoke and gases of combustion escape from the outer case or shell.

M is a cold-air flue formed by the wall K and the wall of the outer case, and which leads from the lamp-chamber of the latter to the pipe or stack L.

The lamps H are preferably to be of the center-draft class, and each has on the top of its oil-receptacle a water-pan N, through which a circulation of cold water should be maintained to prevent undue heating of the oil and consequent explosion. Each of said lamps rests upon a four-wheeled truck O, on which the lamp is run into the lamp-chamber. The hollow stacks G have mica doors P, which are opened to admit the lamp. Different kinds of lamps or burners may be used.

R R designate the circulation-pipes through which the hot water from the drum C passes to the system, and R' R' are the return-pipes to the boiler.

The heat from the lamps in passing through the flues B and around the chambers F F' is utilized to a maximum extent, the water being exposed to a large area of heated surface. The smoke and gases of combustion instead of escaping directly from the chamber F' into the pipe or stack L are compelled to pass under and around the upper portion of the wall K.

T designates the supporting-stand for the boiler and water-drum. Said stand consists of end frames or supports, which are placed between the inner and outer shells of the boiler, and which are connected by a crossbar or beam T which extends through the inner shell and between the boiler and drum, being slotted or spread at $t$ to allow the neck

*c* to pass therethrough. Secured to said beam near each end are the circle and half-circle supports W for the boiler and drum.

Having thus described my invention, what I claim as new, and desire to secure by Letters Patent, is—

1. The herein described hot water and steam heating apparatus, consisting essentially of a boiler and its superposed drum, a double wall packed shell which incloses the said boiler and drum, said shell conforming approximately in cross section to that of the said boiler and drum, and forming a heating chamber which entirely surrounds the boiler and drum, the wall K which extends up at one side of the boiler and drum, and is extended horizontally over the same, a series of hollow stacks depending from the lower portion of the said shell and communicating therewith, said stacks being adapted to receive suitable burners, circulation pipes communicating with the said boiler and drum, and an inclosing case surrounding said shell and the stacks, substantially as specified.

2. In heating apparatus of the character described, the combination with the cylindric horizontal boiler having a series of vertical heating flues, the superimposed drum connected to said boiler by a hollow neck, and the shell which incloses the said boiler and drum, of the stand having the end supports, the connecting bar which extends between the said boiler and drum and embraces the said neck, and the curved supports in which the end portions of the said boiler and drum rest, said boiler and drum being entirely supported by the said stand, substantially as specified.

In testimony whereof I affix my signature in presence of two witnesses.

W. N. WEMMER.

Witnesses:
WM. S. YARD,
WM. H. YARD.